United States Patent
Yen

(10) Patent No.: US 7,231,473 B2
(45) Date of Patent: Jun. 12, 2007

(54) DUAL CHANNEL UNIVERSAL SERIAL BUS STRUCTURE

(75) Inventor: Sheng-Shun Yen, Taipei (TW)

(73) Assignee: Power Quotient International Co., Ltd., Taipei Hsien (TW)

( * ) Notice: Subject to any disclaimer, the term of this patent is extended or adjusted under 35 U.S.C. 154(b) by 503 days.

(21) Appl. No.: 10/815,818

(22) Filed: Apr. 2, 2004

(65) Prior Publication Data

US 2004/0221077 A1 Nov. 4, 2004

(30) Foreign Application Priority Data

Jan. 5, 2003 (TW) .............................. 92208004 U

(51) Int. Cl.
*G06F 3/00* (2006.01)
*G06F 13/00* (2006.01)

(52) U.S. Cl. .............................. 710/62; 710/2; 710/36; 710/107; 710/110

(58) Field of Classification Search .................... 710/5, 710/11, 62, 107, 305; 439/545
See application file for complete search history.

(56) References Cited

U.S. PATENT DOCUMENTS

| D405,053 S | * | 2/1999 | Tan et al. ................... D13/147 |
| 6,210,216 B1 | * | 4/2001 | Tso-Chin et al. ........... 439/545 |
| 6,725,302 B1 | * | 4/2004 | Benayoun et al. ............. 710/62 |
| 6,776,658 B2 | * | 8/2004 | Tang ........................... 439/607 |
| 2004/0260854 A1 | * | 12/2004 | Schade ........................ 710/305 |

OTHER PUBLICATIONS

Universal Serial Bus Specification, Revision 2.0, Apr. 27, 2000, pp. 94,116 and 120.*

* cited by examiner

*Primary Examiner*—Alan S. Chen
(74) *Attorney, Agent, or Firm*—Troxell Law Office, PLLC

(57) ABSTRACT

A Dual Channel Universal Serial Bus (DCUSB) structure compatible with USB 1.0, USB 1.1 or USB 2.0 protocols for higher data transmission rate comprising of two data transmission channels each with two differential signals, a interface controller with data conversion and transmission functions; the interface controller further consists at least one Differential receiver and one current driver, the Differential receiver and the current driver connect to differential signals of interface channels through proper circuitry.

6 Claims, 5 Drawing Sheets

DUAL CHANNEL UNIVERSAL SERIAL BUS STRUCTURE

BACKGROUND OF THE INVENTION

I. Field of the Invention

The present invention relates generally to a Universal Serial Bus (USB) system architecture and particularly, to a Dual Channel Universal Serial Bus (DCUSB) system architecture.

II. Description of the Prior Art

Dual Channel Universal Serial Bus (DCUSB), or generally known as Wideband Serial Bus (WSB), is a high-speed serial bus technology based on USB 2.0 technology. As a new interface technology, this technology is compatible with USB 1.x and USB 2.0 interface bus standard, up to 960 Mbits/sec (or 120 MBytes/sec) in data transmission rate (twice as high as the data transmission rate of USB 2.0 Interface) and applicable to high-speed disk operating system, wired and wireless short-distance data transmission and suitable for the development of such products as portable data storage media.

USB signals currently available include $V_{BUS}$, D+, D−, GND and grounding design used for noise isolation. As a USB interface extensively used currently, it complies with the interface specifications of 1.x and 2.0 versions.

SUMMARY OF THE INVENTION

As described above, in addition to using $V_{BUS}$, D+, D− and GND signals, the present invention applies signals such as $V_{BUS}$, D0+, D0−, D1+, D1− and GND to accelerate data transmission rate. In addition to grounding signal for noise isolation purposes, the present invention creates a 6-signal interface and a Master-Slave architecture; wherein, D0+ and D0− are master signals; D0+ and D0− are slave signals. Master signals are responsible for coordination between DCUSB and USB interfaces as well as data transmission while slave signals are responsible for DCUSB interface protocol and data transmission. See FIG. 1 for description of detailed embodiment.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
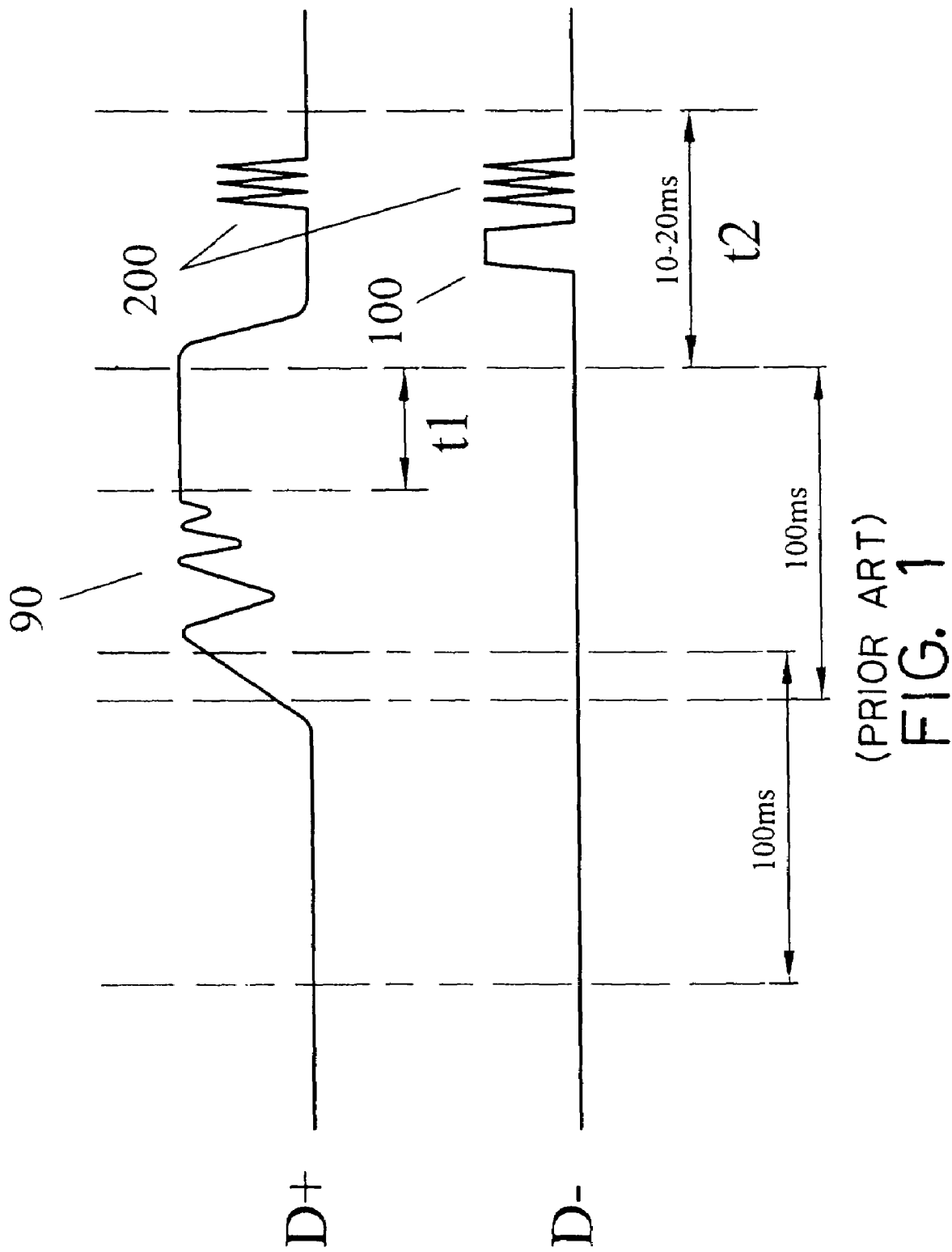
FIG. 1 is a Chirp sequence of the USB 2.0 of the prior art.

FIG. 1 shows the signal diagram when the USB 2.0 device is inserted into Host. Wherein D+ signal produces signal bounce 90; in the duration, time t1, bus kept in idle status after signal stabilizes; during t2, Chirp sequence must be completed between Host and Device to confirm USB 2.0 transmission protocol will run each other and distinguish USB 1.x from USB 2.0. Chirp sequence starts when Host resets bus, i.e., D+=0 and D−=0; When detecting bus is in reset status, device will send out Chirp K signal (D+=0, D−=1) 100.

After detecting Chirp K signal 100, Host will send out Chirp K and Chirp J (D+=1, D−=0) thrice respectively, a total of 6 chirps generated at 200. Now, the system enters USB 2.0 transmission protocol and completes Chirp sequence.

Figure 2:
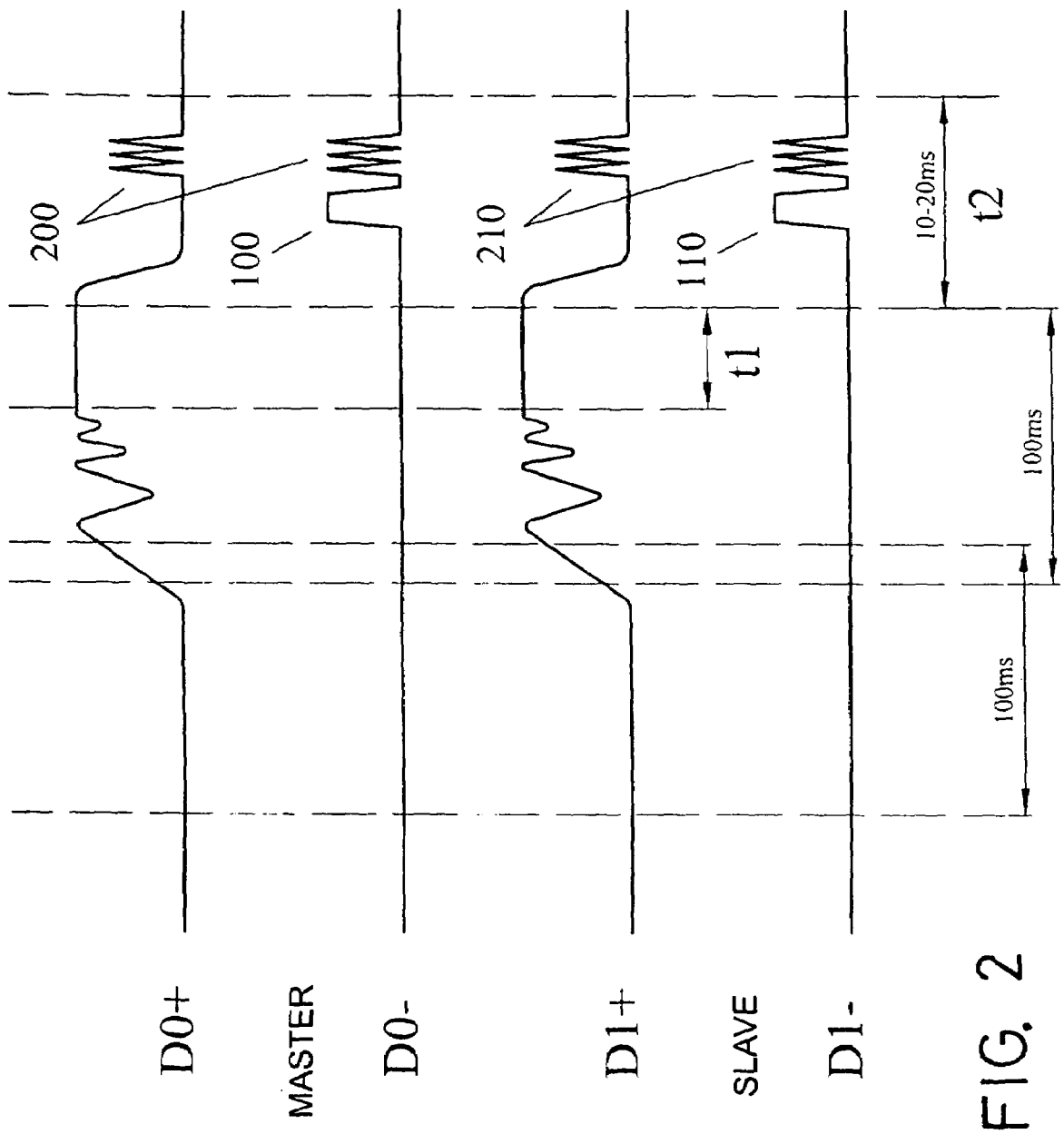
FIG. 2 is a Chirp sequence of the present invention.

FIG. 2 shows the Chirp sequence of DCUSB protocol in the present invention. Using this method, Host and Device can identify each other's operating range as USB 1.x or USB 2.0 or DCUSB. When connected with Device (FIG. 2), Host will start to reset Bus (D0+=0, D0−=0, D1+=0 and D1−=0) at start of t2. If Device only has USB 2.0 function and does not have Slave signal (D1+ and D1−), Host cannot detect Chirp K on D1− and thus enters USB 2.0 mode and completes USB 2.0 Chirp sequence on Master signal (D0+ and D0−).

If Device is a DCUSB device, Device will complete the same Chirp sequence on Slave signal lines as the Host (FIG. 2), wherein, 100 is Master's Chirp K and 200 is Master's Chirp K and Chirp J; 110 is Slave's Chirp K and 210 is Slave's Chirp K and Chirp J. After Host and Device use Master and Slave signals to complete DCUSB chirp sequence, the system enters DCUSB protocol. After the system enters DCUSB protocol, four signal lines D0+, D0−, D1+ and D1− are enabled.

Based on the sequence described above that the DCUSB does not exist in USB 1.x protocol, because that USB 1.x does not have Chirp sequence. That's to say, despite the dual channel was designed in DCUSB, DCUSB does not produce Chirp sequence and the Slave signals are disabled when operating on USB 1.x Host or Device, and USB 2.0 Chirp sequence will not occur either. The data transmission rate of the system is the same as the known USB 1.x device and will not double USB 1.x data transmission rate. As a result, DCUSB technology is compatible with USB 1.x and USB 2.0 specifications.

Figure 3:
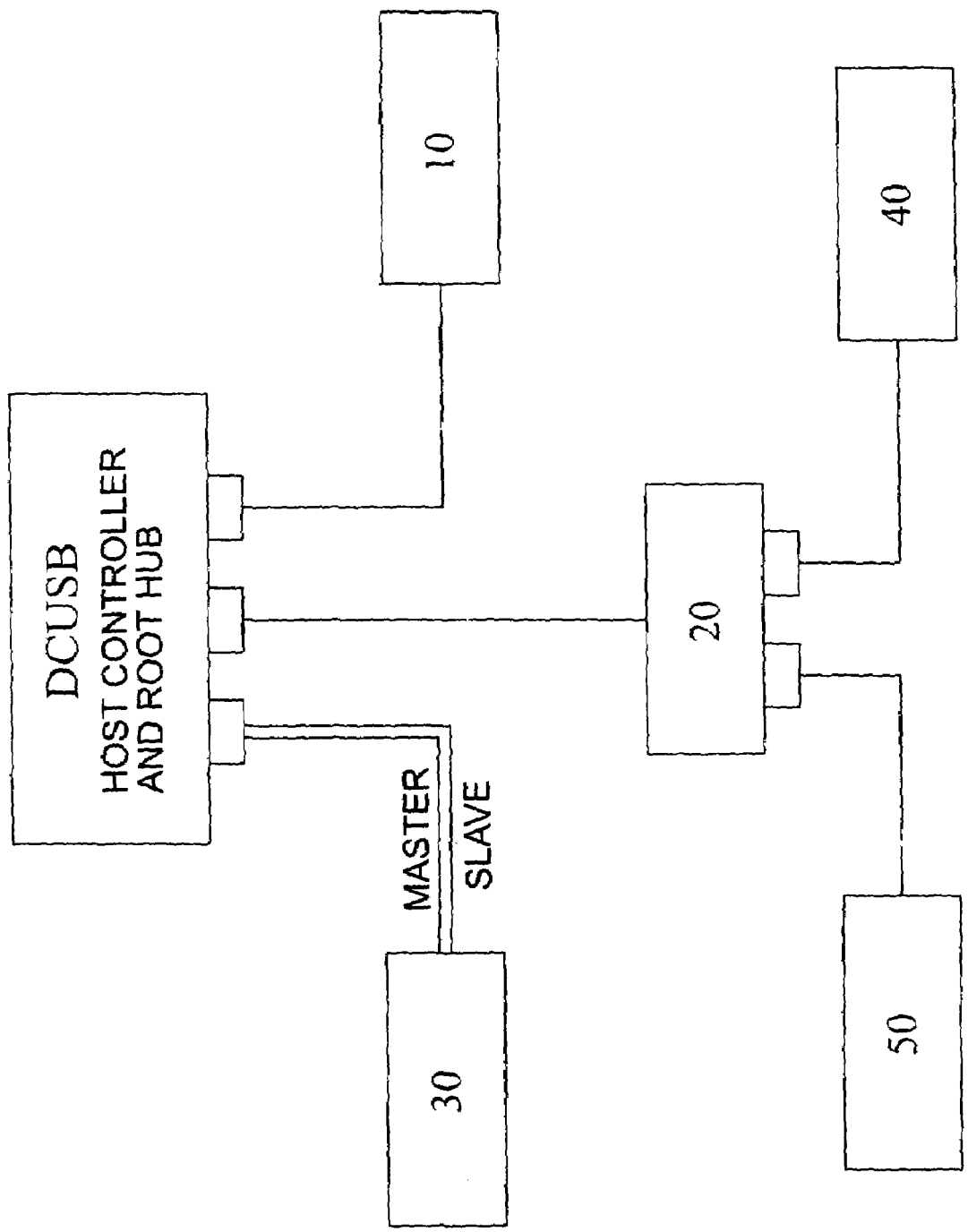
FIG. 3 is a block diagram of the present invention.

FIG. 3 shows the wiring diagram of the system, wherein a DCUSB host controller with DCUSB interface function serves as a Root hub, which can connect a DCUSB device 30, a USB 2.0 hub 20 and a USB 2.0 device 10; USB 2.0 hub 20 can connect to another USB 2.0 hub 50 and a USB 1.x hub 40. The above connecting configuration is achieved because DCUSB interface protocol is compatible with USB 1.x and USB 2.0 specifications, the DCUSB device 30 can transmit data at a rate twice as high as USB 2.0 data transmission rate. If connected with an USB 2.0 hub 20, DCUSB device 30 still can use the USB 2.0 interface protocol as Host signal to complete single channel connection while maintaining USB 2.0 standard in data transmission rate, i.e., 480 Mbits/sec.

Figure 4:
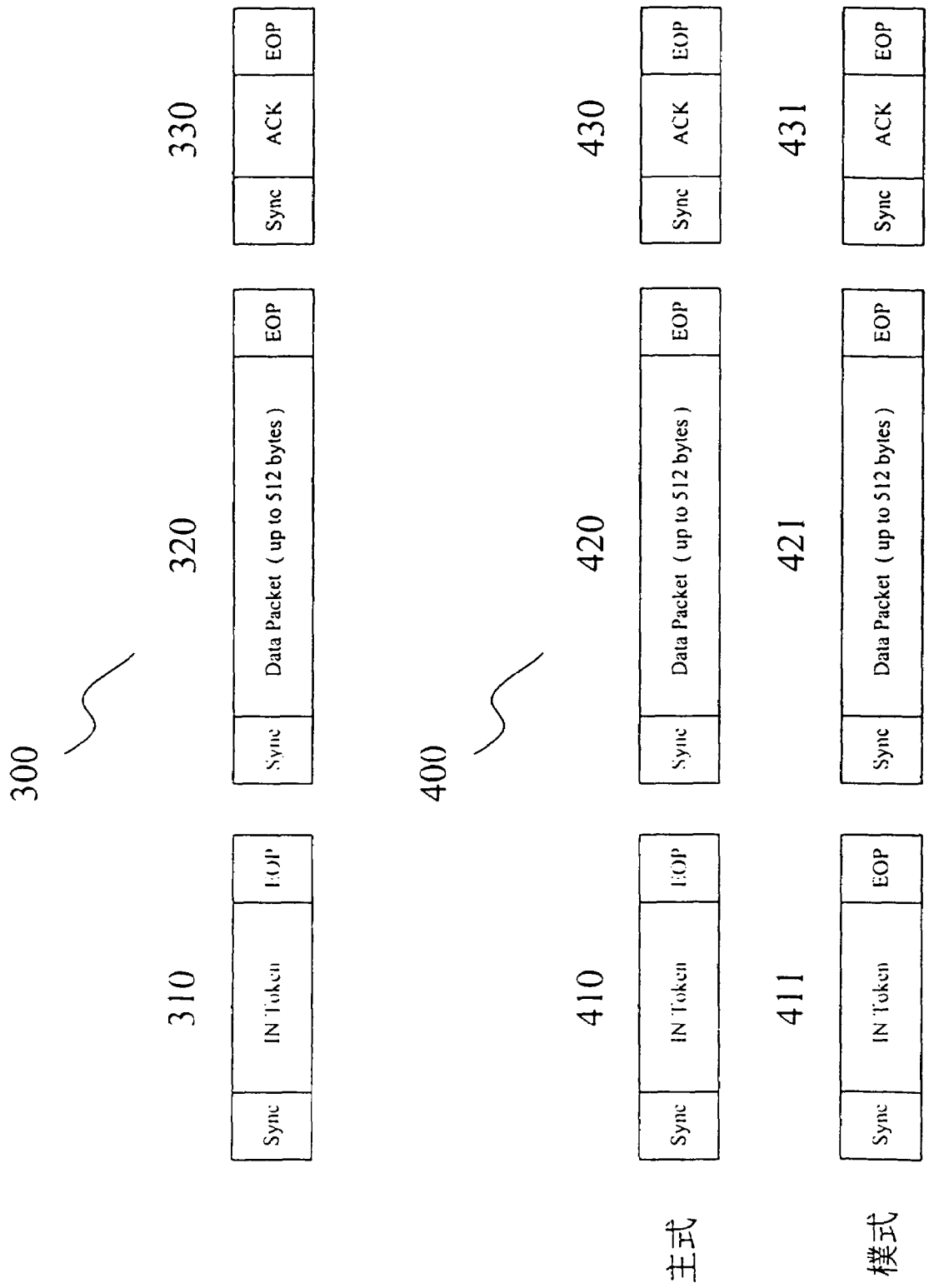
FIG. 4 is a packet diagram of the present invention.

In terms of packet transmission technology, DCUSB also uses the same packet structure as USB 2.0, including four types of packets, such as Token packets, Data packets, Handshake packets and Special Packets. These four types of packets can be operated on Master and Slave signals but Slave signals only accept In and Out signal transmission of Token packets, they do not accept the SOF (Start Of Frame) and Setup of the Token packets. Referring to FIG. 4, 300 stands for USB 2.0 data In Transaction which comprises three packets: In Token Packet 310, Data Packet 320 and Handshake Packet 330. After the Host sends out In Token Packet 310, the Device sends out Data Packet 320 accordingly; after receiving and confirming data, the Host sends out Handshake Packet 330 telling Device that data is OK and thus completes data input.

The In Transaction 400 for DCUSB data is jointly completed by Master signal and Slave signal: immediately after Host sends out In Token packets 410 and 411 on Master and Slave signals, the Device sends Data packets 420 and 421; after receiving and confirming data from Master and Slave signals, the Host sends out Handshake packets 430 and 431 telling Device that data is correct and thus completes data input.

Master signal and Slave signal are not synchronous in time. Therefore, when data transmission error occurs in one side, the other side will not produce Handshake packets 430 or 431; the interface controller on the transmission side will stop sending out follow-up data but continues sending out the same Data packet until the interface controller on the reception side receives correct data and sends out Handshake packet. When data error occurs, two channels (Master signal channel and Slave signal channel) serve as Retry channels to send out data; when Master signal channel is occupied by other USB device, Slave signal channel can continue to send out data, thus accelerating overall data transmission rate. The same mechanism can work on data Out Transaction. As described above, the Signal Original Frame transaction (SOF transaction) and Setup transaction only occur to Master signals, indicating that Slave signals are only responsible for data transmission.

After the system enters DCUSB mode, only data In/Out Transaction applies Slave signals and thus creates a dual channel mode. The architecture simplifies DCUSB system design while substantially accelerating data transmission rate.

Figure 5:
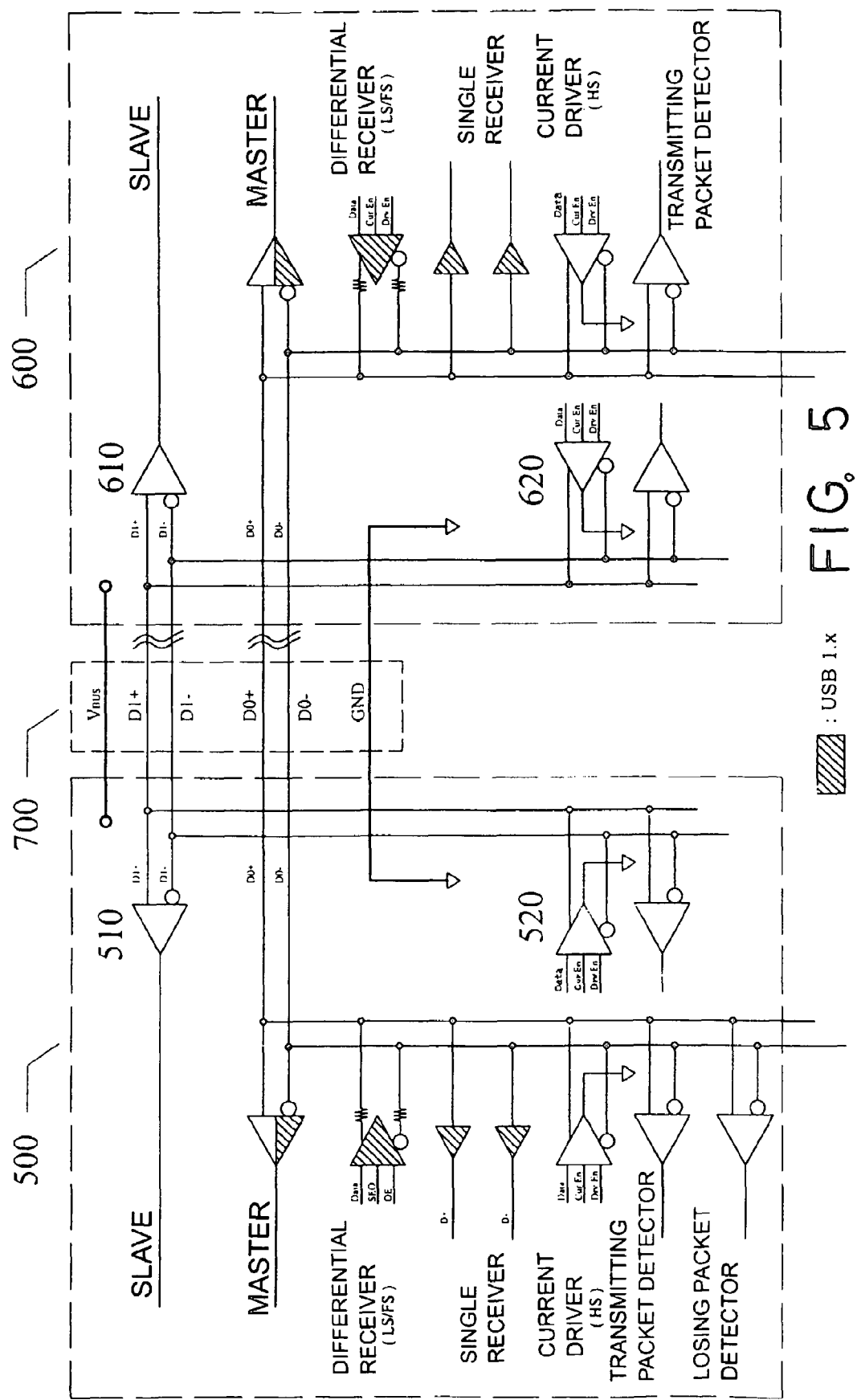
FIG. 5 is a circuit diagram of the present invention.

FIG. 5 shows the wiring diagram of the DCUSB, wherein the oblique-line dash area stands for low-speed USB 1.x components; 500 stands for DCUSB Host; 600 stands for DCUSB Device; 510 stands for Host Differential receiver which outputs a Slave differential output signal; 520 stands for current driver; 610 stands for Device Differential receiver which outputs a Slave differential output signal; and 620 stands for current driver. Referring to FIG. 5, components 510, 520, 610 and 620 are connected via Slave signals D1+ and D1−, and jointly create a Slave channel, wherein 700 is the DCUSB interface in the present invention.

To sum up, the system design in the present invention represents an important innovation for interface technology. While a preferred embodiment of the invention has been shown and described in detail, it will be readily understood and appreciated that numerous omissions, changes and additions may be made without departing from the spirit and scope of the invention.

What is claimed is:

1. A data transmission interface compatible with USB protocols, including USB 1.0, USB 1.1 and USB 2.0, and comprising at least the following interface signals: Vbus, D0+, D0−, D1+, D1− and GND signals, D0+, D0− are one differential signal set, D1+, D1− are another differential signal set, Vbus offers interface power, GND connects to ground, said differential signal sets D0+, D0− and D1+, D1− are further designed into Master-Slave structure, said D0+, D0− is Master and said D1+, D1− is Slave, said Master signals D0+, D0− are responsible for coordination USB 1.0. USB 1.1 or USB 2.0 interfaces as well as data transmission.

2. The data transmission interface recited in claim 1, wherein said Slave differential signal set D1+, D1− in a Dual Channel Universal Serial Bus (DCUSB) device are responsible for data transmission and for enhancing the data transmission rate of said interface.

3. The data transmission interface recited in claim 2, wherein said Master differential signal set D0+, D0− and said Slave differential signal set D1+, D1− apply Chirp sequence to complete the transmission protocol, the Chirp sequence comprises of a plurality of Chirp J and Chirp K, Chirp J in said Master signal set is D0+=1 and D0−=0, Chirp J in said Slave signal set is D1+1 and D1−0, Chirp K in said Master signal set is D0+=0 and D0−=1, Chirp K in said Slave signal set is D1+=0 and D1−=1.

4. The data transmission interface recited in claim 1, wherein said Master differential signal set and said Slave differential signal set are not synchronous in time, when data transmission error occurs in one of said differential signal sets, an interface controller stops sending out data but continues sending out a same Data packet until the interface controller on the reception side receives correct data and sends out a Handshake packet.

5. A Dual Channel Universal Serial Bus (DCUSB) device, wherein the interface comprises four differential signals, which are grouped into Master differential signal set and Slave differential signal set, wherein said Master differential signal set is responsible for the transmission protocols of USB or DCUSB to a host system and is compatible with USB protocol transmission interface: said Slave differential signal set is for enhancing the data transmission rate of the interface wherein said device further comprises an interface controller with data conversion and transmission functions.

6. The Dual Channel Universal Serial Bus (DCUSB) device recited in claim 2, wherein said interface controller consists at least of a Differential receiver and a current driver, said Differential receiver and said current driver being electrically connected to differential signals of interface channels.

* * * * *